US012593016B2

(12) United States Patent
Shin

(10) Patent No.: US 12,593,016 B2
(45) Date of Patent: Mar. 31, 2026

(54) ENVIRONMENTALLY AWARE TONE MAPPING FOR A TELEVISION DISPLAY

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 56 days.

(21) Appl. No.: 18/511,602

(22) Filed: Nov. 16, 2023

(65) Prior Publication Data

US 2025/0168306 A1 May 22, 2025

(51) Int. Cl.
*H04N 9/64* (2023.01)
*G06F 3/14* (2006.01)
*G06T 11/00* (2006.01)

(52) U.S. Cl.
CPC ............. *H04N 9/64* (2013.01); *G06F 3/1407* (2013.01); *G06T 11/001* (2013.01)

(58) Field of Classification Search
CPC ........ H04N 9/64; G06F 3/1407; G06T 11/001
See application file for complete search history.

(56) References Cited

U.S. PATENT DOCUMENTS

| | | | |
|---|---|---|---|
| 9,123,272 B1 | 9/2015 | Baldwin et al. | |
| 11,238,344 B1 | 2/2022 | Cosic | |

| | | | |
|---|---|---|---|
| 2018/0114359 A1 | 4/2018 | Song et al. | |
| 2022/0201434 A1 * | 6/2022 | Nguyen | H04W 4/029 |
| 2022/0321961 A1 * | 10/2022 | Hama | H04N 21/4532 |
| 2022/0375378 A1 * | 11/2022 | Kunkel | G06F 3/147 |

OTHER PUBLICATIONS

Ikebe, et al., "HDR Tone Mapping: System Implementations and Benchmarking", ITE Trans. on MTA vol. 10, No. 2, 2022, pp. 27-51.
Extended European Search Report for European Application No. 24210432.1, mailed Mar. 21, 2025, 9 pages.

* cited by examiner

*Primary Examiner* — Yassin Alata
(74) *Attorney, Agent, or Firm* — Brake Hughes Bellermann LLP

(57) ABSTRACT

According to an aspect, a method may include receiving, by a display device, ambient light measurement data from ambient light measurement devices. The method may include calculating distance measurements indicative of a measured distance between the ambient light measurement devices. The method may include generating a light measurement graph based on the ambient light measurement data and the distance measurements. The method may include generating a raw tone mapping function based on the light measurement graph, the generating using a spatially aware graph neural network. The method may include applying the raw tone mapping function to media content to generate a color corrected version of the media content. The method may include displaying on a display of the display device the color corrected version of the media content.

19 Claims, 8 Drawing Sheets

200

250

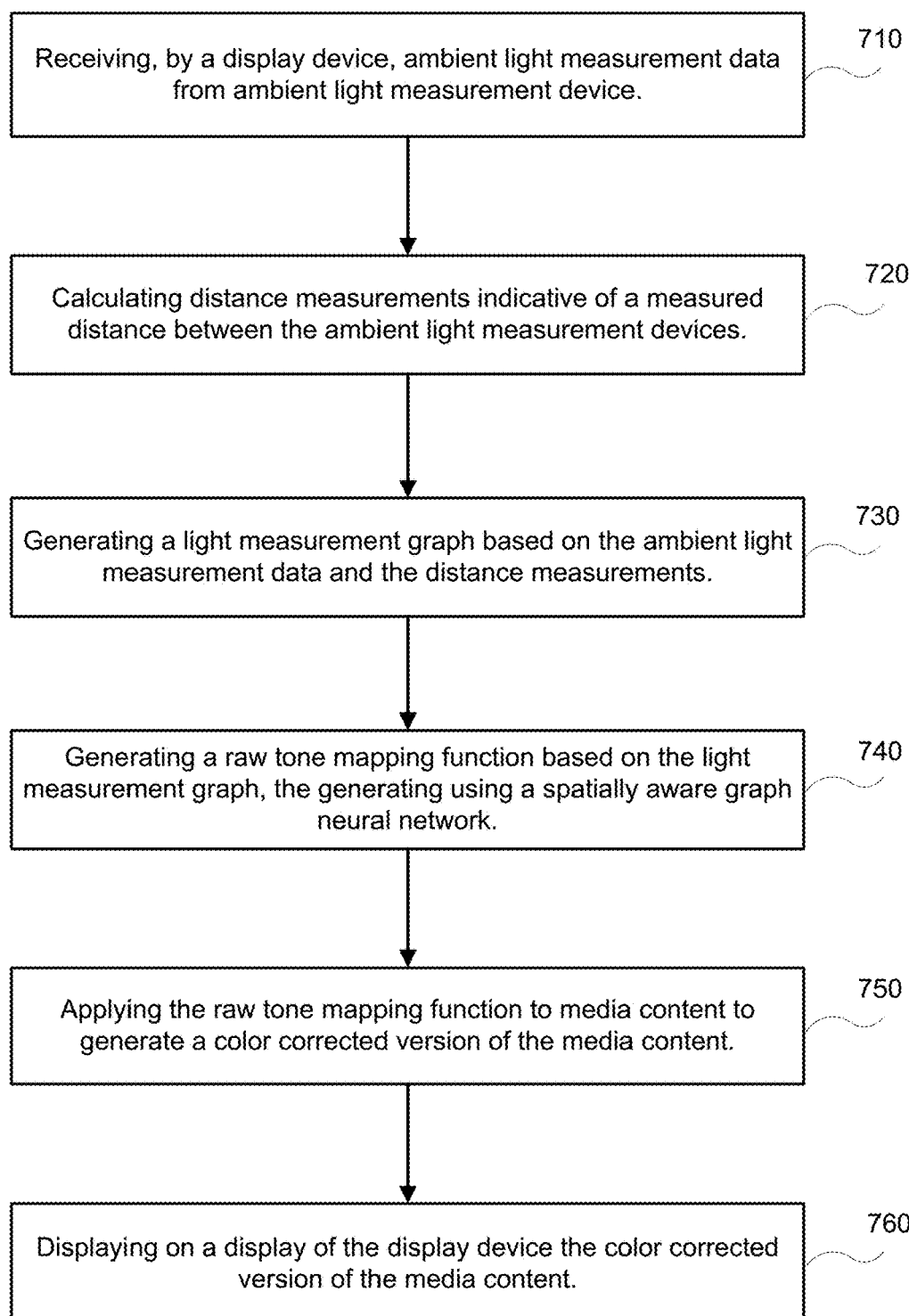

700

Receiving, by a display device, ambient light measurement data from ambient light measurement device. 710

Calculating distance measurements indicative of a measured distance between the ambient light measurement devices. 720

Generating a light measurement graph based on the ambient light measurement data and the distance measurements. 730

Generating a raw tone mapping function based on the light measurement graph, the generating using a spatially aware graph neural network. 740

Applying the raw tone mapping function to media content to generate a color corrected version of the media content. 750

Displaying on a display of the display device the color corrected version of the media content. 760

FIG. 7

ENVIRONMENTALLY AWARE TONE MAPPING FOR A TELEVISION DISPLAY

BACKGROUND

A user may watch television in a variety of different environments or environmental conditions. The environment may influence the immersive experience of the user while watching the television. In some implementations, media content that is displayed on the television and favorably viewed by the user in one environment may not be favorably viewed by the user in another different environment.

SUMMARY

An experience of a user watching a television show or a movie on a television set in a room in the user's house may be different depending on the ambient lighting in the room. The user may be watching a movie on TV during daylight hours and the room may be brightly lit by natural and/or artificial light. The user may watch the movie in the evening when the room may be dimly lit. Adjusting the display tone mapping for a display of a TV based on the ambient light conditions of the room where the user is watching the TV may enhance an immersive viewing experience for a user. For example, to provide a favorable viewing experience to the user, the television would not blast or project strong white light into the room when the user is viewing the TV in a dimly lit room. Conversely, to provide a similar favorable viewing experience to a user, the television may increase the light levels of the content displayed on the TV when the room is brightly lit.

In some aspects, the techniques described herein relate to a method including: receiving, by a display device, ambient light measurement data from ambient light measurement devices; calculating distance measurements indicative of a measured distance between the ambient light measurement devices; generating a light measurement graph based on the ambient light measurement data and the distance measurements; generating a raw tone mapping function based on the light measurement graph, the generating using a spatially aware graph neural network; applying the raw tone mapping function to media content to generate a color corrected version of the media content; and displaying on a display of the display device the color corrected version of the media content.

In some aspects, the techniques described herein relate to a method, wherein calculating the distance measurements includes utilizing one of an ultra wide band indoor positioning measurement technique, or a high accuracy distance measurement technique.

In some aspects, the techniques described herein relate to a method, wherein the display device receives the light measurement graph from a designated host device.

In some aspects, the techniques described herein relate to a method, wherein the designated host device is a mobile computing device.

In some aspects, the techniques described herein relate to a method, wherein receiving the ambient light measurement data includes periodically polling the ambient light measurement devices.

In some aspects, the techniques described herein relate to a method, wherein generating the light measurement graph includes: identifying ambient light measurement devices not located in a room with the display device; and filtering out the ambient light measurement data received from the identified ambient light measurement devices not located in the room for use as a basis for the generating of the light measurement graph.

In some aspects, the techniques described herein relate to a method, wherein generating the color corrected version of the media content includes providing a scaling vector to a display rendering engine of the display device.

In some aspects, the techniques described herein relate to a method, wherein the spatially aware graph neural network is back propagated.

In some aspects, the techniques described herein relate to a method, wherein the display device is a television set including a display.

In some aspects, the techniques described herein relate to a method, wherein the ambient light measurement devices include at least one of a smartphone, a smart watch, or a smart home device.

In some aspects, the techniques described herein relate to a method, wherein the display device is a network-connected display device.

In some aspects, the techniques described herein relate to a non-transitory computer-readable medium storing executable instructions that when executed by at least one processor of a display device cause the at least one processor to execute operations, the operations including: receiving, by the display device, ambient light measurement data from ambient light measurement devices; calculating distance measurements indicative of a measured distance between the ambient light measurement devices; generating a light measurement graph based on the ambient light measurement data and the distance measurements; generating a raw tone mapping function based on the light measurement graph, the generating using a spatially aware graph neural network; applying the raw tone mapping function to media content to generate a color corrected version of the media content; and displaying on a display of the display device the color corrected version of the media content.

In some aspects, the techniques described herein relate to a non-transitory computer-readable medium, wherein calculating the distance measurements includes utilizing one of an ultra wide band indoor positioning measurement technique, or a high accuracy distance measurement technique.

In some aspects, the techniques described herein relate to a non-transitory computer-readable medium, wherein the display device receives the ambient light measurement data from a designated host device.

In some aspects, the techniques described herein relate to a non-transitory computer-readable medium, wherein the designated host device is a mobile computing device.

In some aspects, the techniques described herein relate to a non-transitory computer-readable medium, wherein receiving the ambient light measurement data includes periodically polling the ambient light measurement devices.

In some aspects, the techniques described herein relate to a non-transitory computer-readable medium, wherein generating the color corrected version of the media content includes providing a scaling vector to a display rendering engine of the display device.

In some aspects, the techniques described herein relate to a system including: at least one processor; and a non-transitory computer-readable medium storing instructions that when executed by the at least one processor cause the system to: receive ambient light measurement data from ambient light measurement devices; calculate distance measurements indicative of a measured distance between the ambient light measurement devices; generate a light measurement graph based on the ambient light measurement data and the distance measurements; generate a raw tone mapping function based on the light measurement graph, the generating using a spatially aware graph neural network; apply the raw tone mapping function to media content to generate a color corrected version of the media content; and display on a display of the system the color corrected version of the media content.

In some aspects, the techniques described herein relate to a system, wherein generating the color corrected version of the media content includes providing a scaling vector to a display rendering engine.

In some aspects, the techniques described herein relate to a system, wherein the spatially aware graph neural network is back propagated.

The details of one or more implementations are set forth in the accompanying drawings and the description below. Other features will be apparent from the description and drawings, and from the claims.

BRIEF DESCRIPTION OF THE DRAWINGS

FIG. 7 illustrates a flowchart depicting example operations of applying display color equalization to a display of a TV according to implementations described throughout this disclosure.

DETAILED DESCRIPTION

Figure 1A:
FIGS. 1A-B illustrate examples of immersive viewing experiences of a user watching media content on a display of a networked-connected display device according to implementations described throughout this disclosure.

An experience of a user watching streaming media content on a display (e.g., a display device, a display screen, a display panel) of a television set (e.g., a TV) may be influenced by the viewing environment. For example, a user may watch a movie on the display of the television while comfortably sitting on a sofa in a room of their home. The user may be located at a distance from the TV for favorable viewing of the movie. In some implementations, the room may be brightly lit by natural and/or artificial light. For example, the user may watch the movie during daylight hours. In some implementations, the room may be dimly lit. For example, the user may watch the movie in the evening with light provided by a lamp or other light sources. The technical problem is how to automatically adjust a display tone mapping for a television set based on the lighting conditions in the room to provide an enjoyable TV viewing experience to a user.

In some implementations, display tone mapping for a display of a TV may enhance an immersive viewing experience for a user. For example, the display tone mapping may decrease a color gap between the content displayed on the display of the TV and the environment of the television (e.g., the surroundings beyond the television). For example, if a user is watching a movie in a dimly lit or dark room, to provide a favorable viewing experience to the user, the television would not blast or project strong white light into the room.

In some implementations, to enhance an immersive viewing experience, the user may interface with a television application that facilitates the displaying of selected streaming media content on the television. The television application may gather ambient light measurements from devices that are located in the same environment as the television. The gathering of the light measurements from these devices may be referred to herein as device sourcing. The television application may automatically apply display color equalization to the streaming media content. The display color equalization may be based on ambient light measurements provided to the television application by the devices located in the same environment as the television. For example, systems and methods described herein may provide, as a technical solution, a framework for automatic display color equalization.

The framework may use device sourced ambient light sensor (ALS) measurements for ambient light in the viewing environment for determining display color equalization for applying to the streaming media content that will provide a pleasant user viewing experience of the streaming media content on the television. The ambient light sensors may be included in many devices of a user that may be found in the same room as the television. These devices may include, but are not limited to, smartphones, smart watches, and smart home devices. The framework may apply a spatially aware graph neural network to the ambient light measurements sourced from the ambient light sensors of the devices of the user that are in the same room as the television. The application of the spatially aware graph neural network may extrapolate the ALS measurements into the room where the television is located. As a technical effect, the framework may use the extrapolated measurements to determine a color mapping strategy for use in display color equalization that may provide an optimized user viewing experience.

Figure 1B:

FIGS. 1A-B illustrate examples of immersive viewing experiences of a user watching media content on a display of a networked-connected display device according to implementations described throughout this disclosure. For example, referring to FIG. 1A, a user may watch streaming media content (e.g., a movie, a television show, a video, etc.) on a network connected display device 110 (e.g., a television set, a smart television) in a first viewing environment 100. The first viewing environment 100 may be a well-lit or brightly lit room. Referring to FIG. 1B, a user may watch streaming media content (e.g., a movie, a television show, a video, etc.) on the network connected display device 110 in a second viewing environment 150. The second viewing environment 150 may be a poorly lit or dimly lit room.

In some implementations, the networked-connected display device may implement display tone mapping to provide a favorable viewing experience to the user when immersed in the environments shown in FIGS. 1A-B. The display tone mapping may apply different color filters to the same media content when displaying the media content on the net-worked-connected display device. For example, the display tone mapping may apply a first color filter to the media content when displaying the media content on the network connected display device 110 in the first viewing environment 100. The display tone mapping may apply a second color filter to the same media content when displaying the media content on the network connected display device 110 in the second viewing environment 150.

The color filters may adjust the color mapping of the media content to provide a brightness and tone for the display that provides favorably viewing for the lighting level of the viewing environment. For example, referring to FIG. 1A, the color filters may adjust the color mapping of the media content to display the media content on the network connected display device 110 projecting strong white light into the second viewing environment 150. For example, referring to FIG. 1B, the color filters may adjust the color mapping of the media content to display the media content on the network connected display device 110 without pro-jecting strong white light into the second viewing environ-ment 150. Both examples may apply a color filter to the received media content to enhance the viewing experience of the user in each viewing environment.

Figure 2A:
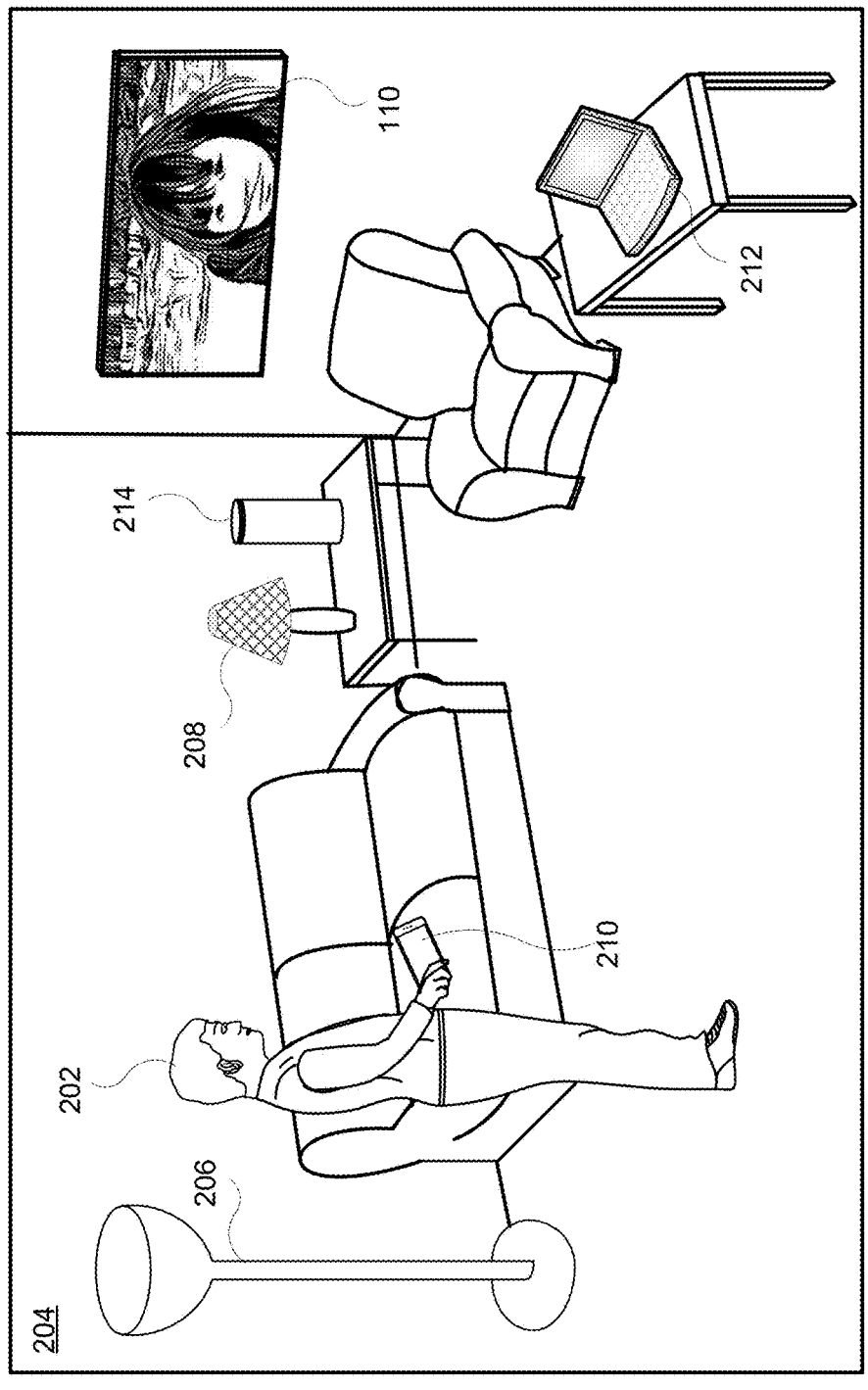
FIGS. 2A-B illustrate examples of immersive viewing experiences of a user watching media content on a display of a TV located in a room with one or more devices that can provide ambient light measurements indicative of the lighting in the room according to implementations described throughout this disclosure.
Figure 2B:
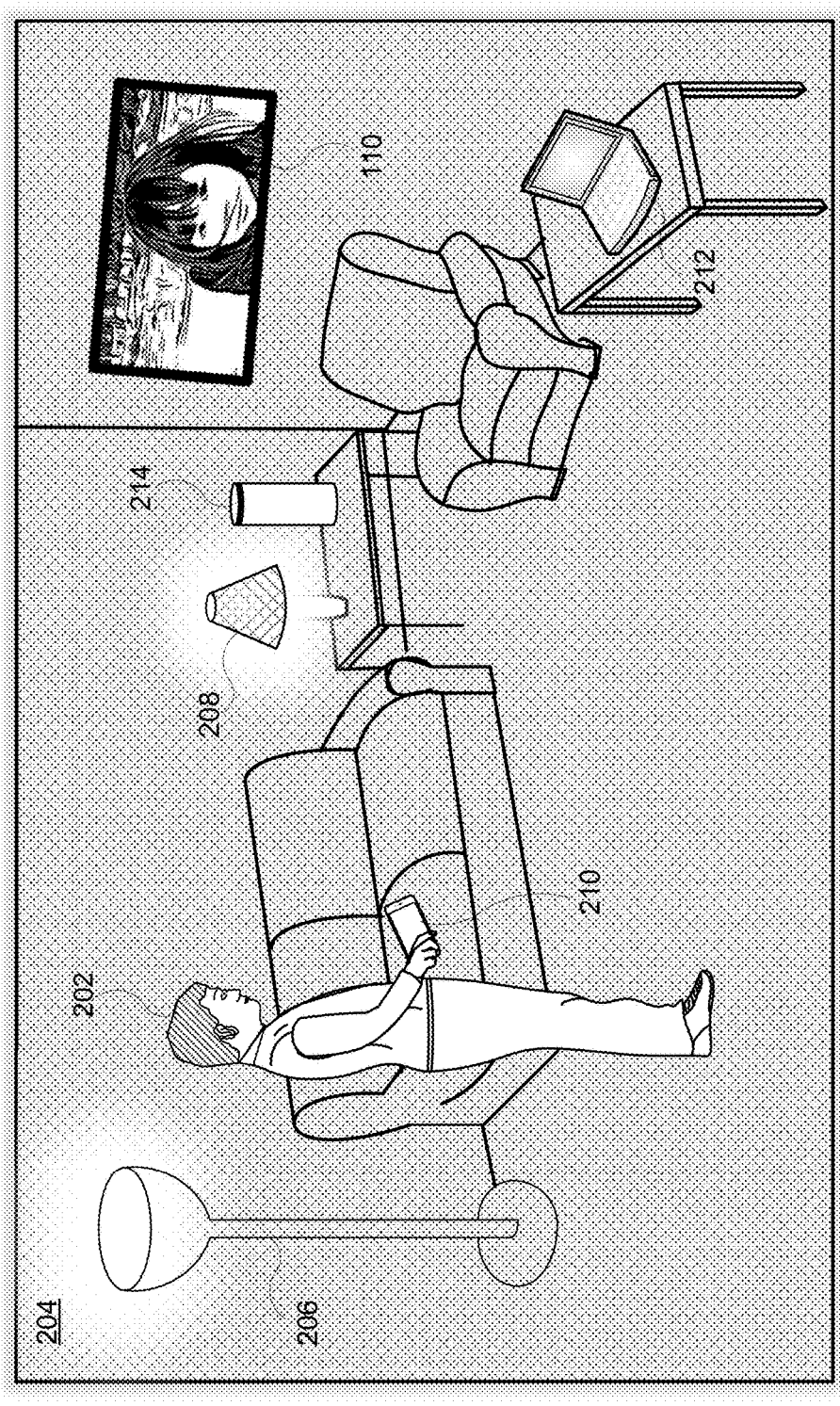

FIGS. 2A-B illustrate examples of immersive viewing experiences of a user watching media content on a display of a TV located in a room with one or more devices that can provide ambient light measurements indicative of the light-ing in the room according to implementations described throughout this disclosure. Referring to FIGS. 2A-B, a user 202 may be watching media content on the network con-nected display device 110 in a room 204. Referring to FIG. 2A, the room 204 may be well-lit or brightly lit providing a bright viewing environment 200 for the user 202. For example, the user may be watching the media content during daylight hours. Referring to FIG. 2B, the user 202 may be watching media content on the network connected display device 110 in the room 204 under different lighting condi-tions than those of the example shown in FIG. 2A. For example, the user may be watching the media content during nighttime hours when the room is more dimly lit, with one or more lamps or other sources of ambient light (e.g., a floor lamp 206, a tabletop lamp 208) providing the ambient lighting for the room 204. The room 204 when dimly lit may provide a dark viewing environment 250 for the user 202.

The room 204 may include light sources (e.g., a floor lamp 206, a tabletop lamp 208) and computing devices that include ambient light sensors (e.g., a smartphone 210, a laptop computer 212, and a smart speaker 214). The room 204 may also include other devices that include ambient light sensors that may provide ambient light measurements to the network connected display device 110. The smart-phone 210, the laptop computer 212, and the smart speaker 214, for example, may include ambient light sensors that may provide ambient light measurements indicative of the lighting conditions in the room 204 to the network con-nected display device 110. Examples of other mobile com-puting devices that may include ambient light sensors that may provide ALS measurements to the network connected display device 110 (e.g., a smart TV) may include smart home devices such as smart lighting systems, smart ther-mostats, smart door locks, smart security cameras and systems, smart kitchen appliances, smart household moni-tors, smart plugs, and virtual assistants. For example, the floor lamp 206 and the tabletop lamp 208 may include smart light bulbs that are a light source for the room 204 and may also include ambient light sensors that may provide ambient light measurements to the network connected display device 110.

The network connected display device 110 may receive ALS measurements from ambient light sensors in the room 204. The network connected display device 110 may imple-ment display color equalization as described herein to pro-vide the user 202 with a pleasant viewing experience of media content on the network connected display device 110 in both the bright viewing environment 200 and the dark viewing environment 250.

Figure 3:
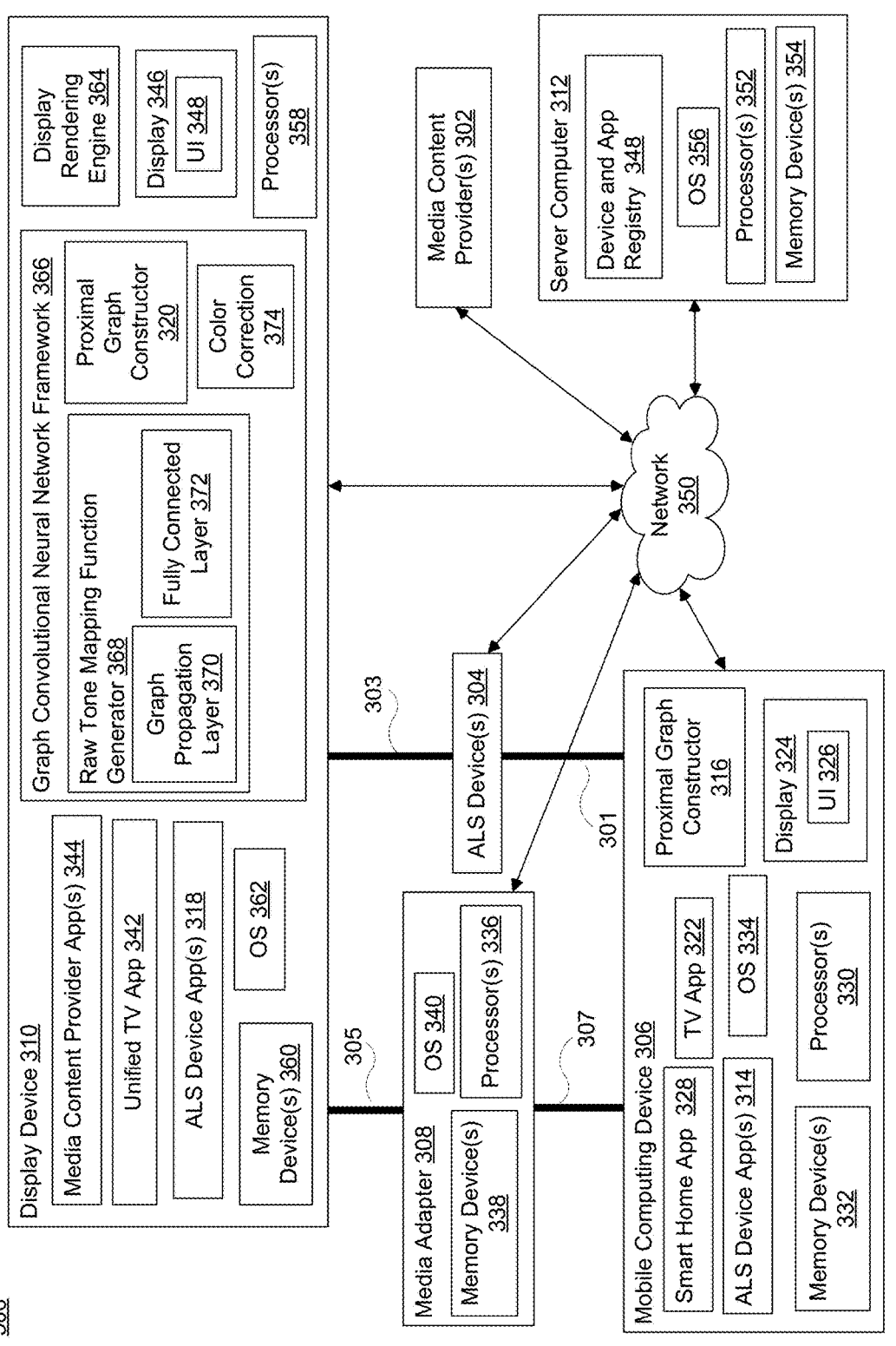
FIG. 3 illustrates an example system for providing display color equalization for a display of a TV according to implementations described throughout this disclosure.

FIG. 3 illustrates an example system 300 for providing display color equalization for a display of a network con-nected display device (e.g., a display of a television set) according to implementations described throughout this disclosure. Referring also to FIGS. 2A-B, the system 300 may include one or more media content providers 302, a network 350, one or more ambient light measurement devices 304 (e.g., the smartphone 210, the laptop computer 212, the smart speaker 214), a mobile computing device 306 (e.g., the smartphone 210, the laptop computer 212), a media adapter 308 (e.g., a casting device), a display device 310 (e.g., the network connected display device 110), and one or more server computers (e.g., server computer 312). In some implementations, the mobile computing device 306 may also serve as an ambient light measurement device.

An ambient light measurement device may include one or more ambient light sensors that may generate ambient light sensor measurements that are measurements of an amount of ambient light in a room that includes the ambient light measurement device. In some implementations, the sensor(s) included in an ambient light measurement device may measure an amount of ambient light within a threshold range of the ambient light measurement device (e.g., within one foot, two feet, three feet, etc.).

In some implementations, the display device 310, which may also be referred to as a network-connected display device (e.g., the network connected display device 110), may be connected to or interfaced with the mobile comput-ing device 306, the media adapter 308, the media content providers 302, the server computer 312, and the ambient light measurement devices 304 by way of the network 350. Referring also to FIGS. 1A-B and 2A-B, a user (e.g., the user 202) may watch media content on the display device 310 that is color corrected to provide display color equalization for favorable viewing in a variety of different viewing environments such as the first viewing environment 100, the second viewing environment 150, the bright viewing envi-ronment 200, and the dark viewing environment 250.

In some implementations, the ambient light measurement devices 304 may connect to and interface with the mobile computing device 306. For example, the mobile computing device 306 may connect to and interface with the ambient light measurement devices 304 by way of the network 350. In some implementations, the mobile computing device 306 may establish a wireless communication link 301 with each of the ambient light measurement devices 304. In these implementations where the ambient light measurement devices 304 are in communication with the mobile comput-ing device 306, the mobile computing device 306 may operate as a designated host device. The mobile computing device 306 may execute one or more ambient light sensor device applications 314 that provide an interface to the one or more ambient light measurement devices 304 to facilitate the gathering of ambient light measurement data from the ambient light measurement devices 304. For example, an ambient light measurement device may include one or more light sensors that can measure an amount of ambient light in a room or area.

The designated host device may process the ambient light measurement data. The designated host device may identify ambient light measurement devices located in proximity to the display device 310 (e.g., ambient light measurement devices that are located in the same room as the display device 310). The designated host device may construct or generate a proximal graph of the identified ambient light measurement devices. For example, the ambient light sensor device applications 314 may provide the ambient light measurement data obtained from the ambient light measurement devices 304 identified as being proximate to the display device 310 to a designated host device proximal graph constructor 316. The designated host device proximal graph constructor 316 may construct or generate a proximal graph of a distance between each ambient light measurement device and an ambient light measurement for each respective identified ambient light measurement device.

In some implementations, the ambient light measurement devices 304 may connect to and interface with the display device 310. For example, the display device 310 may connect to and interface with the ambient light measurement devices 304 by way of the network 350. In some implementations, the display device 310 may establish a wireless communication link 303 with each of the ambient light measurement devices 304. In addition, or in the alternative, ambient light sensor device applications 318 executing on the display device 310 may interface with the ambient light measurement devices 304 to facilitate the gathering of ambient light measurement data from the ambient light measurement devices 304.

The display device 310 may process the ambient light measurement data. The display device 310 may identify ambient light measurement devices located in proximity to the display device 310 (e.g., ambient light measurement devices that are located in the same room as the display device 310). The display device 310 may construct or generate a proximal graph of the identified ambient light measurement devices. For example, the ambient light sensor device applications 318 may provide the ambient light measurement data obtained from the ambient light measurement devices 304 identified as being proximate to the display device 310 to a proximal graph constructor 320. The proximal graph may include a distance between each ambient light measurement device, and an ambient light measurement for each respective identified ambient light measurement device.

The ambient light measurement devices 304 may connect to and interface with at least one or both of the display device 310 and the mobile computing device 306. For example, in implementations where the computing power of the display device 310 may be limited, the mobile computing device 306 may construct or generate the proximal graph. The mobile computing device 306 may provide the proximal graph to the display device 310 for further processing by the display device 310 for generating a color correction scaling vector for use in providing display color equalization for the display device 310.

The mobile computing device 306 may be configured to execute the ambient light sensor device applications 314. In some implementations, the ambient light sensor device applications 314 may be associated with respective ambient light measurement devices 304. The ambient light sensor device applications 314 may interface with the respective ambient light measurement devices 304 to obtain information and data from the ambient light measurement devices 304 indicative of lighting conditions in proximity to the ambient light measurement devices 304. In some implementations, the mobile computing device 306 may be a designated host device. As a designated host device, the designated host device proximal graph constructor 316 executing on the mobile computing device 306 may construct or generate a proximal graph based on the information and data provided by the ambient light measurement devices 304. In some implementations, the mobile computing device 306 may send or transmit the obtained information and data to the display device 310 by way of the network 350 for use by the proximal graph constructor 320.

The ambient light measurement devices 304 may be periodically polled for ambient light measurement data. The designated host device proximal graph constructor 316 and/or the proximal graph constructor 320 may periodically poll (e.g., every second, every minute, every five minutes, every 30 minutes, every hour) the ambient light measurement devices 304 for ambient light measurement data. The graph convolutional neural network framework 366 may apply display tone mapping on a timed basis that is favorable to the user. For example, referring to FIG. 2B, the user 202 may turn on another light source in the room 204 for a short period of time (e.g., a minute, a few minutes, etc.). It may not be beneficial to the viewing experience of the user 202 to readjust the display tone mapping based on the additional ambient light introduced into the room 204 for a short period of time. In some implementations, the graph convolutional neural network framework 366 may periodically poll the ambient light measurement devices 304 to determine if ambient light measurement changes have occurred for more than a threshold period of time (e.g., more than five minutes, more than ten minutes) before changing the display tone mapping based on a change in the ambient light level in the room 204.

The mobile computing device 306 may be configured to execute a TV application 322. The mobile computing device 306 may include a mobile computing device display 324 configured to display a user interface (UI) 326. For example, the TV application 322 may generate one or more user interfaces for display in the UI 326. The TV application 322 may generate a user interface that provides a remote control that the user may interact with to control the display device 310.

In some implementations, the TV application 322 may facilitate the access to media content provided by the media content providers 302 for viewing on the display device 310. The TV application 322 may provide a user interface that allows a user to select media content for viewing on the display device 310. In some implementations, the user may interact with the TV application 322 to select streaming services (e.g., free services, subscription-based services) for viewing media content on the display device 310.

The mobile computing device 306 may be configured to execute a smart home application 328. A user may interact with the smart home application 328 to access and control the ambient light measurement devices 304 using the ambient light sensor device applications 314. The smart home application 328 may provide a framework for managing the ambient light measurement devices 304 as well as for managing and interacting with the display device 310 and the media adapter 308.

The mobile computing device 306 may be any type of computing device that includes one or more processors (processor(s) 330), one or more memory devices (memory devices 332), and an operating system 334. The mobile computing device 306 may be a smartphone, a tablet, a wearable device, a laptop computer, or a desktop computer. In some implementations, the operating system 334 may be system software that manages computer hardware, software resources, and provides common services for computing programs.

In some implementations, the mobile computing device 306 may be a tablet, a smartphone, or a wearable. In these implementations, the operating system 334 may be referred to as a mobile operating system. The mobile operating system may be configured to execute on devices that, in general, include display devices that may be smaller in size than, for example, a display device included in a laptop computer or a desktop computer. In some implementations, the mobile computing device 306 may be a laptop computer. In these implementations, the operating system may be referred to as a laptop or desktop operating system. In these implementations, the operating system 334 may be an operating system designed for a display that is larger in size than that included in a tablet, a smartphone, or a wearable.

In some implementations, the ambient light measurement devices 304 may be one or more of the mobile computing devices such as a tablet, a smartphone, or a wearable. In some implementations, the mobile computing device 306 may also function as an ambient light measurement device.

The system 300 may include the media adapter 308. The media adapter 308 may facilitate providing (e.g., streaming) media content from one or more streaming services of the media content providers 302 to the display device 310. For example, the media adapter 308 may directly connect to a connector on the display device 310 by way of the connection 305. The media adapter 308 may connect to or interface with the mobile computing device 306 by way of a wireless communications link 307. The media adapter 308 may access the media content providers 302 to obtain media content by way of the network 350. The mobile computing device 306 may interact with the media adapter 308. The media adapter 308 may provide digital video and/or audio to the display device 310. For example, the media adapter 308 may connect to a high-definition multimedia interface (HDMI) connector included in the display device 310. Examples of the media adapter 308 may include, but are not limited to, a set-top box, a television box, and a streaming media adapter. The media adapter 308 may be configured to stream media content received from the media content providers 302 by way of the network 350 to the display device 310. In a non-limiting example, the media adapter 308 may be a casting device and the display device 310 may be a television (e.g., a smart TV).

In some implementations, a user may connect to and interact with the media adapter 308 using the TV application 322. The user, interacting with the TV application 322, may select streaming services (e.g., free services, subscription-based services) for viewing media content on the display device 310. The media adapter 308 can facilitate the interface between the media content providers 302 and the display device 310.

The media adapter 308 may be any type of computing device that includes one or more processors (processor(s) 336), one or more memory devices (memory devices 338), and an operating system 340. In some implementations, the processor(s) 336 may include a system on a chip (SoC). The SoC may include a central processing unit (CPU), a graphic processing unit (GPU), one or more memory interfaces, and one or more input/output interfaces and devices. In some implementations, the operating system 340 may be system software that manages computer hardware, software resources, and provides common services for computing programs.

The server computer 312 may be configured to interface with the mobile computing device 306, the display device 310, the ambient light measurement devices 304, the media adapter 308, and the media content providers 302 by way of the network 350. The server computer 312 may include a device and application registry 348. The device and application registry 348 may store information for one or more user accounts managed by the server computer 312. The device and application registry 348 may store information for one or more user devices and/or applications associated with each of the one or more user accounts. For example, the device and application registry 348 may store information for the media adapter 308, the display device 310, the mobile computing device 306, the media content providers 302, the ambient light measurement devices 304, and the display device 310. The device and application registry 348 may store information for the television application 322, one or more media content provider applications 344, a unified television application 342, the smart home application 328, and the ambient light sensor device applications 314.

The server computer 312 may be computing devices that take the form of a number of different devices, for example a standard server, a group of such servers, or a rack server system. In some implementations, the server computer 312 may be a single system sharing components such as one or more processors (e.g., processor(s) 352) and one or more memory devices (e.g., memory device(s) 354).

In some implementations, in addition or in the alternative, the memory device(s) 354 may represent any kind of (or multiple kinds of) memory (e.g., RAM, flash, cache, disk, tape, etc.). In some implementations, the memory device(s) 354 may include external storage, e.g., memory physically remote from but accessible by the server computer 312. The server computer 312 may include one or more modules, engines, or applications representing specially programmed software. In some implementations, the server computer 312 may include an operating system 356. For example, the memory device(s) 354 may store the operating system 356 and applications that, when executed by the processor(s) 352, may perform operations on the server computer 312.

The network 350 may include the Internet and/or other types of data networks, such as a local area network (LAN), a wide area network (WAN), a cellular network, satellite network, or other types of data networks. The network 350 may also include any number of computing devices (e.g., computer, servers, routers, network switches, etc.) that are configured to receive and/or transmit data within the network 350. The network 350 may further include any number of hardwired and/or wireless connections. The network 350 may be, for example, communications networks having one or more types of topologies, including but not limited to the Internet, intranets, local area networks (LANs), cellular networks. Ethernet, Storage Area Networks (SANs), telephone networks, and Bluetooth personal area networks (PAN). In some implementations, two or more devices in a sub-network may be coupled by way of a wired connection, while at least some of the devices in the same sub-network are coupled by way of a local radio communication network (e.g., ZigBee, Z-Wave, Instcon, Bluetooth, Wi-Fi and other radio communication networks).

In some implementations, the wireless communication link 301, the wireless communication link 303, and the wireless communication link 307 may be short-range wireless connections such as a Bluetooth connection. In some examples, wireless communication link 301, the wireless communication link 303, and the wireless communication link 307 may be a Wi-Fi (e.g., direct Wi-Fi) connection.

The mobile computing device 306 may include the mobile computing device display 324. In some implementations, the mobile computing device display 324 is a display device such as a liquid crystal display (LCD), a light-emitting diode (LED) display, an organic light-emitting diode (OLED) display, or an active-matrix organic light-emitting diode (AMOLED) display. The display device 310 may include a display 346. In some implementations, the display 346 is a display device such as a liquid crystal display (LCD), a light-emitting diode display (LED) display, a plasma display, a quantum dot light-emitting diode display (QLED) display, or an organic light-emitting diode (OLED) display.

The display device 310 may be configured to execute the unified television application 342. For example, the display device 310 may be a smart television. For example, a smart television may be a network-enabled display device that may connect to media content providers by way of a network. The media content providers may source media content to the smart television. In these implementations, a user may interact with the unified television application 342 to access media content from the media content providers 302.

The display device 310 may include the one or more media content provider applications 344. The media content provider applications 344 may be native applications for subscription-based streaming services. In some implementations, in addition or in the alternative, one or more of the media content provider applications 344 may be for no-fee based streaming services.

The media content provider applications 344 may provide streaming media content from a respective media content provider (e.g., a streaming service platform) to the display device 310 for viewing on the display 346. In some implementations, the media content provider applications 344 may be downloaded to the display device 310 from the media content providers 302 by way of the network 350. The display device 310 may display a user interface (UI) 348 on the display 346 that includes media content items for selection and further viewing by a user on the display device 310.

The display device 310 may be configured to execute the ambient light sensor device applications 318. In some implementations, the ambient light sensor device applications 318 may be associated with respective ambient light measurement devices 304. The ambient light sensor device applications 318 may interface with the respective ambient light measurement devices 304 to obtain information and data from the ambient light measurement devices 304 indicative of lighting conditions in proximity to the ambient light measurement devices 304. The proximal graph constructor 320 executing on the display device 310 may construct or generate a proximal graph based on the information and data provided by the ambient light measurement devices 304.

The display device 310 may be configured to connect to the network 350. In some implementations, the display device 310 is a television (e.g., a smart television (TV)). The display device 310 may include one or more processors (processor(s) 358), one or more memory devices (memory device(s) 360), and an operating system (OS) 362. The operating system 362 may execute (or assist with executing) the media content provider applications 344, the unified television application 342 and the ambient light sensor device applications 318. The operating system 362 may execute (or assist with the executing of) applications for implementing a graph convolutional neural network framework 366. The operating system 362 may execute (or assist with the executing of) applications for a display rendering engine 364.

In some implementations, the operating system 362 may be a browser application. A browser application is a web browser configured to access information on the internet by way of a network (e.g., the network 350). A browser application may launch one or more browser tabs in the context of one or more browser windows in the browser application. In some implementations, the operating system 362 is a Linux-based operating system configured to execute (or assist with executing) the applications on the display device 310.

The processor(s) 358, the processor(s) 330, the processor(s) 336, and the processor(s) 352 may be formed in a substrate configured to execute one or more machine executable instructions or pieces of software, firmware, or a combination thereof. The processor(s) 358, the processor(s) 330, the processor(s) 336, and the processor(s) 352 may be semiconductor-based. For example, the processor(s) 358, the processor(s) 330, the processor(s) 336, and the processor(s) 352 may include semiconductor material that can perform digital logic.

The memory device(s) 360, the memory device(s) 332, the memory device(s) 338, and the memory device(s) 354 may include main memory that stores information in a format that can be read and/or executed by the processor(s) 358, the processor(s) 330, the processor(s) 336, and the processor(s) 352 respectively. The memory device(s) 360, the memory device(s) 332, the memory device(s) 338, and the memory device(s) 354 may include one or more random-access memory (RAM) devices and/or one or more read-only memory (ROM) devices.

The memory device(s) 360, memory device(s) 332, the memory device(s) 338, and the memory device(s) 354 may store applications that, when executed by the processor(s) 358, the processor(s) 330, the processor(s) 336, and the processor(s) 352, respectively, perform operations. For example, the memory device(s) 332 may store the operating system 334, the smart home application 328, the ambient light sensor device applications 314, and the TV application 322 that, when executed by the processor(s) 330, may perform operations on the mobile computing device 306. For example, the memory device(s) 360 may store the operating system 362, the unified television application 342, the ambient light sensor device applications 318, the one or more applications for implementing the graph convolutional neural network framework 366, and the one or more applications for the display rendering engine 364 that, when executed by the processor(s) 358, may perform operations on the display device 310.

In some implementations, the memory device(s) 354 may represent any kind of (or multiple kinds of) memory (e.g., RAM, flash, cache, disk, tape, etc.). In some implementations, the memory device(s) 354 may include external storage, e.g., memory physically remote from but accessible by the server computer 312. The server computer 312 may include one or more modules, engines, or applications representing specially programmed software. For example, the memory device(s) 354 may store the operating system 356 that may execute applications on the server computer 312 to perform operations on server computer 312.

The display device 310 may include the graph convolutional neural network framework 366. The display device 310 may set up the graph convolutional neural network framework 366 to estimate a raw tone mapping function from a light measurement graph. The display device 310 may use the raw tone mapping function to generate a color correction vector for use by the display rendering engine 364. The display rendering engine 364 uses the color correction vector to apply display tone mapping to pixels included in selected media content for viewing by a user on the display 346. The display tone mapping will render the media content on the display 346 for favorable viewing by a user based on the viewing environment of the user.

The graph convolutional neural network framework 366 may include a raw tone mapping function generator 368, the proximal graph constructor 320, and a color correction module 374. The raw tone mapping function generator 368 may include a graph propagation layer 370, and a fully connected layer 372. The proximal graph constructor 320 may receive ambient light measurements and distance information from ambient light measurement devices as described herein. The proximal graph constructor 320 may construct or generate a proximal graph as input to the graph propagation layer 370 of the raw tone mapping function generator 368.

The output of the graph propagation layer 370 is provided to the fully connected layer 372. The raw tone mapping function generator 368 (the fully connected layer 372) may output pixel mapping information and data to the color correction module 374. The color correction module 374 may generate a color correction vector for use by the display rendering engine 364. The display rendering engine 364 may apply the color correction vector to the pixel data for the media content selected by the user for viewing on the display 346. The color corrected media content may be input to the display 346.

The graph propagation layer 370 and the fully connected layer 372 may be part of a spatially aware graph neural network that may be used by the raw tone mapping function generator 368 to generate a raw tone mapping function. The color correction module 374 may use the raw tone mapping function to generate a three-dimensional scaling vector that may scale the color of the pixels in the media content selected by a user for viewing on the display device 310. The color correction module 374 may output the three-dimensional scaling vector to the display rendering engine 364. The display rendering engine 364 may apply the three-dimensional scaling vector to the media content to generate a color corrected version of the media content for viewing on the display 346.

Figure 4A:
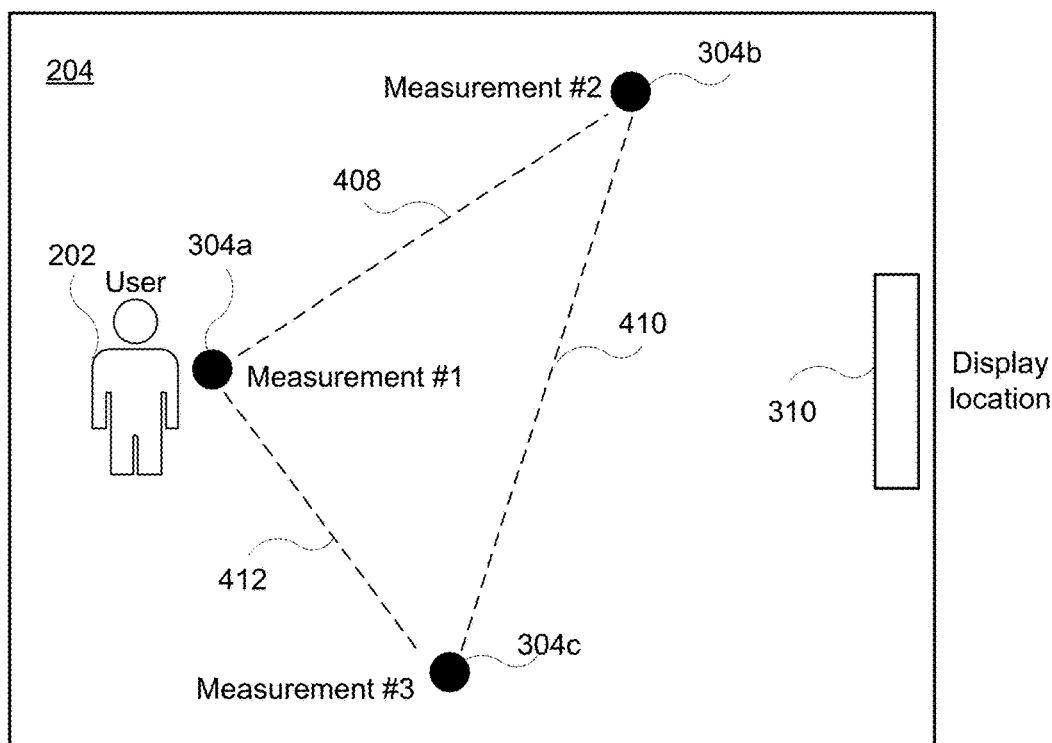
FIGS. 4A-B illustrate example distance measurements between ambient light measurement devices located in a room with a TV that can be used to construct a proximal graph for use in display color equalization for a display of a television set according to implementations described throughout this disclosure.
Figure 4B:
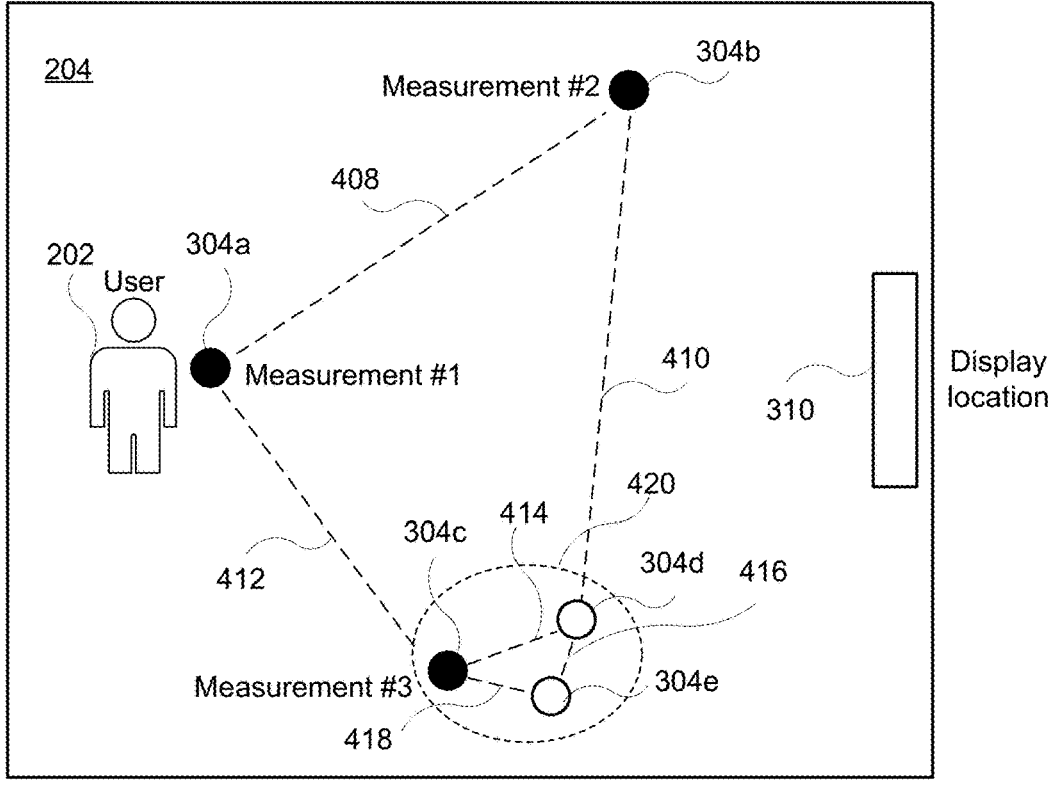

FIGS. 4A-B illustrate example distance measurements between ambient light measurement devices located in a room with a display device that can be used to construct a proximal graph for use in display color equalization for the display of the display device according to implementations described throughout this disclosure. In some implementations, the display device may be a television set, a smart TV, or a network-connected display device.

Referring to FIG. 4A and FIGS. 2A-B and 3, ambient light measurement devices 304a-c are included in the ambient light measurement devices 304 present the room 204 with a display device 310 (e.g., the network connected display device 110) and the user 202. For example, the ambient light measurement device 304a may be the smart speaker 214, the ambient light measurement device 304b may be the smartphone 210, and the ambient light measurement device 304c may be the laptop computer 212.

The proximal graph constructor 320 may construct or generate a proximal graph based on distance measurements between the ambient light measurement devices 304a-c. For example, the proximal graph constructor 320 may construct or generate a proximal graph for the ambient light measurement devices 304a-c using a distance measurement 408 between the ambient light measurement device 304a and the ambient light measurement device 304b, a distance measurement 410 between the ambient light measurement device 304b and the ambient light measurement device 304c, and a distance measurement 412 between the ambient light measurement device 304a and the ambient light measurement device 304c. The proximal graph constructor 320 may construct or generate a proximal graph for the ambient light measurement devices 304a-c using the distance measurements 408, 410, and 412 and the ambient light measurement data for the respective ambient light measurement device 304a-c (e.g., measurement #1, measurement #2, and measurement #3, respectively).

The proximal graph may provide a representation of the ambient light level in the room 204. An adjacency matrix of the proximal graph may describe the distance measurements 408, 410, and 412 in the room 204. In some implementations, the proximal graph constructor 320 may determine the distance measurements 408, 410, and 412 using an ultra-wide band (UWB) indoor positioning measurement technique that may provide real-time location tracking and identification of devices. For example, the ambient light measurement devices 304a-c may include ultra-wide band capabilities. In some implementations, the display device 310 and specifically the proximal graph constructor 320 may utilize the UWB capabilities of the ambient light measurement devices 304a-c to determine or calculate the distance measurements 408, 410, and 412. In some implementations, the proximal graph constructor 320 may determine the distance measurements 408, 410, and 412 using a high accuracy distance measurement (HADM) technique that utilize a wireless short range communication protocol between the ambient light measurement devices 304a-c to determine a distance between the devices. For example, the ambient light measurement devices 304a-c and the display device 310 may include Bluetooth capabilities that may be used for HADM techniques for determining the distance measurements 408, 410, and 412.

FIG. 4B illustrates example distance measurements between ambient light measurement devices in a denser measurement set up located in a room with a television set that can be used to construct a variable graph structure for a proximal graph for use in display color equalization for the display of the television set according to implementations described throughout this disclosure. For example, multiple ambient light measurement devices 304c-e may be grouped or clustered in a location 420 in the room 204. Based on the proximity of the ambient light measurement devices 304c-e as determined by distance measurements 414, 416, and 418, the proximal graph constructor 320 may use the ambient light measurement data for the ambient light measurement device 304c (e.g., measurement #3) as representative of the ambient light conditions in that area of the room 204.

The proximal graph constructor 320 may use distance measurements between ambient light measurement devices to determine if an ambient light measurement may be used in constructing the proximal graph. As described, the proximal graph constructor 320 may use a single ambient light measurement from one ambient light measurement device included in a group or cluster of ambient light measurement devices as representative of an ambient light level in that location in the room.

The proximal graph constructor 320 may determine a threshold distance measurement between ambient light measurement devices that if not exceeded would indicate the ambient light measurement devices are in a group or cluster in the room. For example, a threshold distance may be three feet. In addition, or in the alternative, the proximal graph constructor 320 may determine that the ambient light measurement devices 304c-e are in a group or cluster based on the similarity of the ambient light measurements provided by the ambient light measurement devices 304c-c.

In some implementations, the proximal graph constructor 320 may use an average of the ambient light measurement data received from the ambient light measurement devices 304c-e as the ambient light measurement data for constructing the proximal graph. In some implementations, the proximal graph constructor 320 may use other criteria for determining which ambient light measurement device's data of the ambient light measurement devices 304c-e to use for the proximal graph. The other criteria may be a based on a distance measurement between the ambient light measurement devices 304c-e and the ambient light measurement device 304b (e.g., the ambient light measurement device of the ambient light measurement devices 304c-e closest to the ambient light measurement device 304b, the ambient light measurement device of the ambient light measurement devices 304c-e farthest from the ambient light measurement device 304b). The other criteria may be based on a distance measurement between the ambient light measurement devices 304c-e and the ambient light measurement device 304a (e.g., the ambient light measurement device of the ambient light measurement devices 304c-e closest to the ambient light measurement device 304a, the ambient light measurement device of the ambient light measurement devices 304c-e farthest from the ambient light measurement device 304a).

The proximal graph constructor 320 may use a distance from the display device 310 to each ambient light measurement device to determine if an identified ambient light measurement device is in the room 204. For example, a user may have many ambient light measurement devices in a home of the user that may be included in the smart home application 328. These ambient light measurement devices, however, may be located in different rooms in the house of the user. As described, the display device 310 may include the ability to determine a distance measurement between the display device 310 and each ambient light measurement device included in the smart home application 328. The proximal graph constructor 320 may determine that an ambient light measurement device that may provide ambient light measurement data to the display device 310 may not be located in the room 204. Therefore, the proximal graph constructor 320 may not use the ambient light data provided by that particular ambient light measurement device to construct the proximal graph.

FIGS. 4-B show three ambient light measurement devices 304a-c in the room 204. In some implementations, the room 204 may include less than three ambient light measurement devices (e.g., two). In some implementations, the room 204 may include more than three ambient light measurement devices (e.g., four, five, six, ten).

FIGS. 4-B show ambient light measurement device 304a-c in the room 204 that are spatially diverse and spread out in the room 204. As such, applying a spatially aware graph neural network to the device sourcing of the ambient light measurement data provided by the ambient light measurement devices 304a-c may allow for the extrapolating of the ambient light measurements into the room 204 where the user 202 is viewing media content on the display device 310 for use by a graph neural network framework for estimating a color mapping and correction strategy for applying to the pixels of the media content before the media content is rendered for display on the display device 310.

Figure 5:
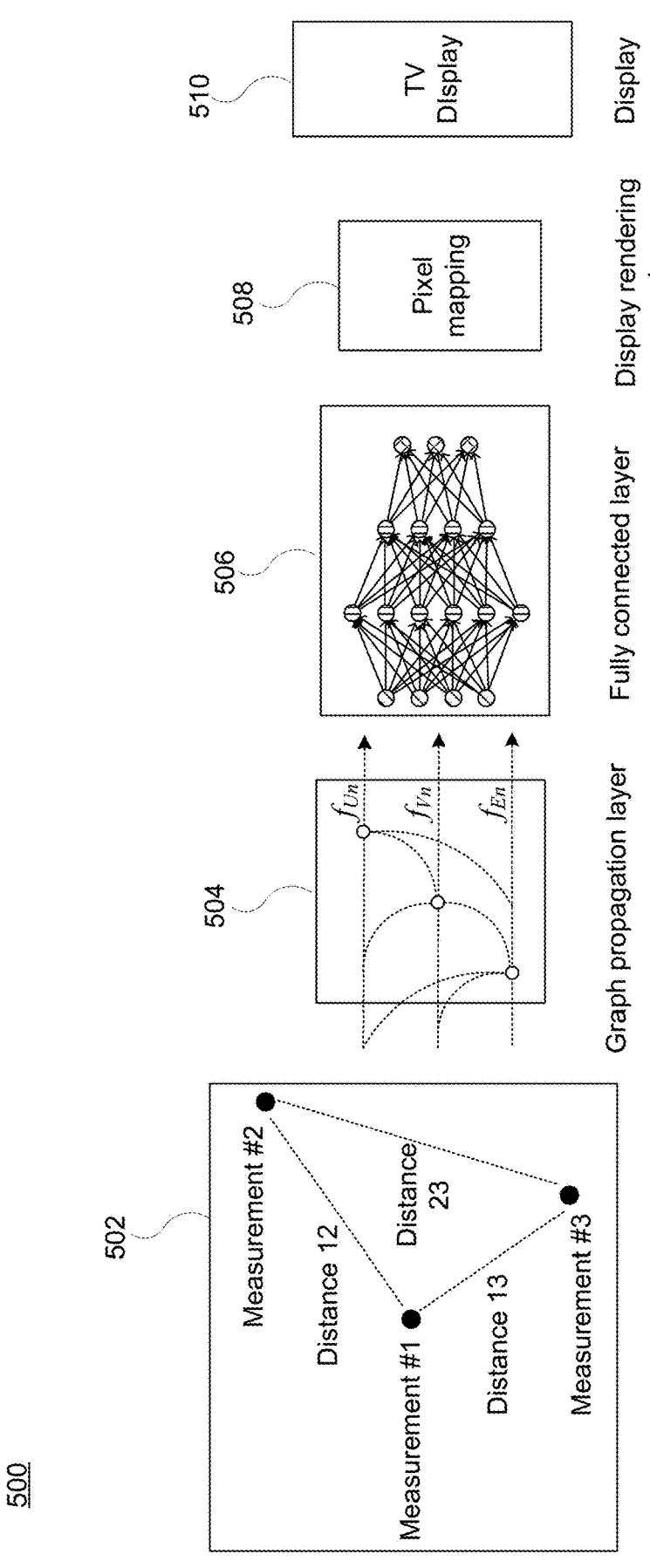
FIG. 5 illustrates an example graph convolutional neural network framework for display color equalization for a display of a TV according to implementations described throughout this disclosure.

FIG. 5 illustrates an example block diagram 500 for a graph convolutional neural network framework for display color equalization for a display of a television set according to implementations described throughout this disclosure. Referring to FIG. 3, the proximal graph constructor 320 may construct or generate a light measurement graph 502. The light measurement graph 502 includes ambient light measurement data (e.g., measurement #1, measurement #2, measurement #3) and distance measurements for the distances between the ambient light measurement devices providing the ambient light measurement data (e.g., distance 12, distance 23, and distance 23). For example, referring to FIG. 4A, the light measurement graph 502 may be based on the received ambient light measurement data and distance measurements for the ambient light measurement devices 304a-c in the room 204.

The proximal graph constructor 320 provides the light measurement graph 502 to the graph propagation layer 370 represented by the graph propagation layer block 504. The output of the graph propagation layer 370 is input to the fully connected layer 372 represented by the fully connected layer block 506. The output of the fully connected layer 372 is a three-dimensional vector that can be applied to the pixels of the media content by the display rendering engine 364 represented by the pixel mapping block 508. The output of the pixel mapping block 508 may be color corrected media content for viewing on the display 346 represented by TV display block 510.

Figure 6:
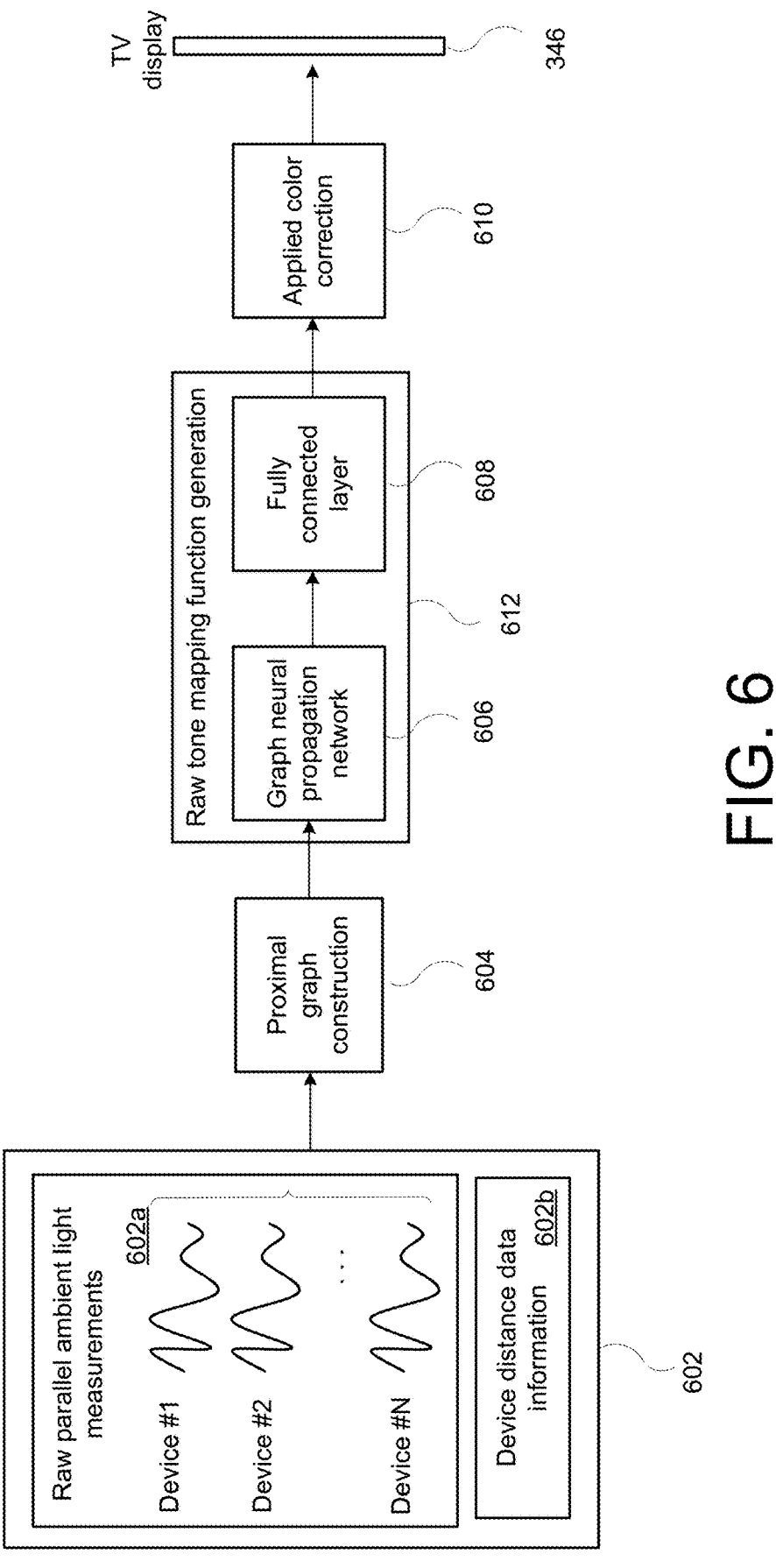
FIG. 6 illustrates an example algorithmic block diagram for implementing display color equalization for a display of a TV according to implementations described throughout this disclosure.

FIG. 6 illustrates an example algorithmic block diagram 600 for implementing display color equalization for a display of a television set according to implementations described throughout this disclosure. Referring to FIGS. 3, 4A-B, and 5, the display device 310 receives raw parallel ambient light measurement data (block 602a) from ambient light measurement devices 304 (e.g., device #1, device, #2, . . . device #N). The display device 310 uses one or more distance measurement techniques to facilitate the receiving of device distance data information (block 602b). The raw parallel ambient light measurement data and the device distance data information are included in block 602 that is input to proximal graph constructor 320 (proximal graph construction block 604). In some implementations, as described with reference to FIG. 3, the mobile computing device 306 may operate as a designated host device that may process the ambient light measurement data and may determine the distance measurements between the ambient light measurement devices The designated host device may construct or generate the proximal graph (block 604).

The proximal graph constructor 320 provides the generated light measurement graph to the graph propagation layer 370 (graph neural propagation network block 606) of the raw tone mapping function generator (block 612). The output of the graph propagation layer 370 is input to the fully connected layer 372 (fully connected layer block 608). The graph propagation layer 370 and the fully connected layer 372 may be included in the raw tone mapping function generator 368. The raw tone mapping function generator 368 may be trained using machine learning techniques. The graph propagation layer 370 and the fully connected layer 372 may be fully back propagated to minimize any error in the neural network model's parameters for determining the color correction to apply to the pixel data for the media content. The output of the fully connected layer 372 may be a three-dimensional vector that may be applied to the pixels of the media content by the display rendering engine 364

(applied color correction block 610). The display rendering engine 364 may apply the color correction to the media content using the three-dimensional vector (e.g., a scaling vector) generated by the fully connected layer 372. The display rendering engine 364 may output the resultant color corrected media content to the display 346 for viewing by a user.

FIG. 7 illustrates a flowchart 700 depicting example operations of applying display color equalization to a display of a TV according to implementations described throughout this disclosure. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion. The operations may define a computer-implemented method. Although the flowchart 700 is described with reference to the system 300 of FIG. 3, the flowchart 700 may be executed according to any of the figures discussed herein. In some examples, referring to FIG. 3, the operations of the flowchart 700 are executed by the display device 310.

Operation 710 includes receiving, by a display device, ambient light measurement data from ambient light measurement devices. For example, the display device 310 may receive ambient light measurement data from one or more of the ambient light measurement devices 304 by way of the network 350. In another example, the display device 310 may receive ambient light measurement data from one or more of the ambient light measurement devices 304 by way of the wireless communication link 303. The display device 310 may execute the ambient light sensor device applications 318 to obtain the ambient light measurement data from one or more of the ambient light measurement devices 304.

Operation 720 includes calculating distance measurements indicative of a measured distance between the ambient light measurement devices. For example, referring to FIGS. 4A-B, in some implementations the proximal graph constructor 320 may calculate the distance measurements 408, 410, and 412 using an ultra-wide band (UWB) indoor positioning measurement technique. In some implementations, the proximal graph constructor 320 may calculate the distance measurements 408, 410, and 412 using a high accuracy distance measurement (HADM) technique.

Operation 730 includes generating a light measurement graph based on the ambient light measurement data and the distance measurements. For example, referring to FIG. 5, the proximal graph constructor 320 may generate a light measurement graph 502 that includes ambient light measurement data and distance measurements for the distances between the ambient light measurement devices providing the ambient light measurement data.

Operation 740 includes generating a raw tone mapping function based on the light measurement graph, the generating using a spatially aware graph neural network. For example, the raw tone mapping function generator 368 may include a graph propagation layer 370, and a fully connected layer 372. The graph propagation layer 370 and the fully connected layer 372 may be part of a spatially aware graph neural network that may be used by the raw tone mapping function generator 368 to generate a raw tone mapping function. The proximal graph constructor 320 may receive ambient light measurements and distance information from ambient light measurement devices as described herein. The raw tone mapping function generator 368 may receive a light measurement graph (e.g., a proximal graph) as input to the graph propagation layer 370. The output of the graph propagation layer 370 is provided to the fully connected layer 372. The fully connected layer 372 may output pixel mapping information and data to the color correction module 374.

Operation 750 includes applying the raw tone mapping function to media content to generate a color corrected version of the media content.

Operation 760 includes displaying on a display of the display device the color corrected version of the media content. For example, the color correction module 374 may use the received pixel mapping information and data to generate a color correction vector for use by the display rendering engine 364. The display rendering engine 364 may apply the color correction vector to the pixel data for the media content selected by the user for viewing on the display 346. The color corrected media content may be input to the display 346.

In some examples, the techniques described herein relate to a method including: receiving, by a display device, ambient light measurement data from ambient light measurement devices; calculating distance measurements indicative of a measured distance between the ambient light measurement devices; generating a light measurement graph based on the ambient light measurement data and the distance measurements; generating a raw tone mapping function based on the light measurement graph, the generating using a spatially aware graph neural network; applying the raw tone mapping function to media content to generate a color corrected version of the media content; and displaying on a display of the display device the color corrected version of the media content.

In some examples, the techniques described herein relate to a method, wherein calculating the distance measurements includes utilizing one of an ultra wide band indoor positioning measurement technique, or a high accuracy distance measurement technique.

In some examples, the techniques described herein relate to a method, wherein the display device receives the light measurement graph from a designated host device.

In some examples, the techniques described herein relate to a method, wherein the designated host device is a mobile computing device.

In some examples, the techniques described herein relate to a method, wherein receiving the ambient light measurement data includes periodically polling the ambient light measurement devices.

In some examples, the techniques described herein relate to a method, wherein generating the light measurement graph includes: identifying ambient light measurement devices not located in a room with the display device; and filtering out the ambient light measurement data received from the identified ambient light measurement devices not located in the room for use as a basis for the generating of the light measurement graph.

In some examples, the techniques described herein relate to a method, wherein generating the color corrected version of the media content includes providing a scaling vector to a display rendering engine of the display device.

In some examples, the techniques described herein relate to a method, wherein the spatially aware graph neural network is back propagated.

In some examples, the techniques described herein relate to a method, wherein the display device is a television set including a display.

In some examples, the techniques described herein relate to a method, wherein the ambient light measurement devices include at least one of a smartphone, a smart watch, or a smart home device.

In some examples, the techniques described herein relate to a method, wherein the display device is a network-connected display device.

In some examples, the techniques described herein relate to a non-transitory computer-readable medium storing executable instructions that when executed by at least one processor of a display device cause the at least one processor to execute operations, the operations including: receiving, by the display device, ambient light measurement data from ambient light measurement devices; calculating distance measurements indicative of a measured distance between the ambient light measurement devices; generating a light measurement graph based on the ambient light measurement data and the distance measurements; generating a raw tone mapping function based on the light measurement graph, the generating using a spatially aware graph neural network; applying the raw tone mapping function to media content to generate a color corrected version of the media content; and displaying on a display of the display device the color corrected version of the media content.

In some examples, the techniques described herein relate to a non-transitory computer-readable medium, wherein calculating the distance measurements includes utilizing one of an ultra wide band indoor positioning measurement technique, or a high accuracy distance measurement technique.

In some examples, the techniques described herein relate to a non-transitory computer-readable medium, wherein the display device receives the ambient light measurement data from a designated host device.

In some examples, the techniques described herein relate to a non-transitory computer-readable medium, wherein the designated host device is a mobile computing device.

In some examples, the techniques described herein relate to a non-transitory computer-readable medium, wherein receiving the ambient light measurement data includes periodically polling the ambient light measurement devices.

In some examples, the techniques described herein relate to a non-transitory computer-readable medium, wherein generating the color corrected version of the media content includes providing a scaling vector to a display rendering engine of the display device.

In some examples, the techniques described herein relate to a system including: at least one processor; and a non-transitory computer-readable medium storing instructions that when executed by the at least one processor cause the system to: receive ambient light measurement data from ambient light measurement devices; calculate distance measurements indicative of a measured distance between the ambient light measurement devices; generate a light measurement graph based on the ambient light measurement data and the distance measurements; generate a raw tone mapping function based on the light measurement graph, the generating using a spatially aware graph neural network; apply the raw tone mapping function to media content to generate a color corrected version of the media content; and display on a display of the system the color corrected version of the media content.

In some examples, the techniques described herein relate to a system, wherein generating the color corrected version of the media content includes providing a scaling vector to a display rendering engine.

In some examples, the techniques described herein relate to a system, wherein the spatially aware graph neural network is back propagated.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or non-transitory medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device.

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

Further to the descriptions above, a user may be provided with controls allowing the user to make an election as to both if and when systems, programs, or features described herein may enable collection of user information (e.g., a user's preferences, a user's current location, a user's credentials, etc.), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method comprising:
receiving, by a display device, ambient light measurement data from ambient light measurement devices;
calculating distance measurements indicative of a measured distance between the ambient light measurement devices;
generating a light measurement graph based on the ambient light measurement data and the distance measurements, the generating comprising:
determining that at least one of the ambient light measurement devices is located in a room with the display device;

determining that at least another of the ambient light measurement devices is not located in the room with the display device; and
filtering out the ambient light measurement data received from the ambient light measurement devices not located in the room for use as a basis for the generating of the light measurement graph;
generating a raw tone mapping function based on the light measurement graph, the generating using a spatially aware graph neural network;
applying the raw tone mapping function to media content to generate a color corrected version of the media content; and
displaying on a display of the display device the color corrected version of the media content.

2. The method of claim 1, wherein calculating the distance measurements comprises utilizing one of an ultra wide band indoor positioning measurement technique, or a high accuracy distance measurement technique.

3. The method of claim 1, wherein the display device receives the light measurement graph from a designated host device.

4. The method of claim 3, wherein the designated host device is a mobile computing device.

5. The method of claim 1, wherein receiving the ambient light measurement data comprises periodically polling the ambient light measurement devices.

6. The method of claim 1, wherein generating the color corrected version of the media content comprises providing a scaling vector to a display rendering engine of the display device.

7. The method of claim 1, wherein the spatially aware graph neural network is back propagated.

8. The method of claim 1, wherein the display device is a television set including a display.

9. The method of claim 1, wherein the ambient light measurement devices include at least one of a smartphone, a smart watch, or a smart home device.

10. The method of claim 1, wherein the display device is a network-connected display device.

11. A non-transitory computer-readable medium storing executable instructions that when executed by at least one processor of a display device cause the at least one processor to execute operations, the operations comprising:
receiving, by the display device, ambient light measurement data from ambient light measurement devices;
calculating distance measurements indicative of a measured distance between the ambient light measurement devices;
generating a light measurement graph based on the ambient light measurement data and the distance measurements, the generating comprising:
determining that at least one of the ambient light measurement devices is located in a room with the display device;
determining that at least another of the ambient light measurement devices is not located in the room with the display device; and
filtering out the ambient light measurement data received from the ambient light measurement devices not located in the room for use as a basis for the generating of the light measurement graph;
generating a raw tone mapping function based on the light measurement graph, the generating using a spatially aware graph neural network;

applying the raw tone mapping function to media content to generate a color corrected version of the media content; and displaying on a display of the display device the color corrected version of the media content.

12. The non-transitory computer-readable medium of claim 11, wherein calculating the distance measurements comprises utilizing one of an ultra wide band indoor positioning measurement technique, or a high accuracy distance measurement technique.

13. The non-transitory computer-readable medium of claim 11, wherein the display device receives the ambient light measurement data from a designated host device.

14. The non-transitory computer-readable medium of claim 13, wherein the designated host device is a mobile computing device.

15. The non-transitory computer-readable medium of claim 11, wherein receiving the ambient light measurement data comprises periodically polling the ambient light measurement devices.

16. The non-transitory computer-readable medium of claim 11, wherein generating the color corrected version of the media content comprises providing a scaling vector to a display rendering engine of the display device.

17. A system comprising:

at least one processor; and a non-transitory computer-readable medium storing instructions that when executed by the at least one processor cause the system to:

receive ambient light measurement data from ambient light measurement devices;

calculate distance measurements indicative of a measured distance between the ambient light measurement devices;

generate a light measurement graph based on the ambient light measurement data and the distance measurements, the generating comprising:

determining that at least one of the ambient light measurement devices is located in a room with a display device;

determining that at least another of the ambient light measurement devices is not located in the room with the display device; and filtering out the ambient light measurement data received from the ambient light measurement devices not located in the room for use as a basis for the generating of the light measurement graph;

generate a raw tone mapping function based on the light measurement graph, the generating using a spatially aware graph neural network;

apply the raw tone mapping function to media content to generate a color corrected version of the media content; and display on a display of the system the color corrected version of the media content.

18. The system of claim 17, wherein generating the color corrected version of the media content comprises providing a scaling vector to a display rendering engine.

19. The system of claim 17, wherein the spatially aware graph neural network is back propagated.

* * * * *